United States Patent Office 3,763,236
Patented Oct. 2, 1973

3,763,236
PROCESS FOR PRODUCING N-ALKENYL-ACETAMIDES
Herbert Eck, Joseph Heckmaier, and Hellmuth Spes, Burghausen, Upper Bavaria, Germany, assignors to Wacker-Chemie G.m.b.H., Munich, Bavaria, Germany
No Drawing. Filed June 22, 1970, Ser. No. 48,544
Claims priority, application Germany, June 27, 1969, P 19 32 709.4
Int. Cl. C07c 103/30
U.S. Cl. 260—561 R        2 Claims

ABSTRACT OF THE DISCLOSURE

A process for producing N-alkenyl-acetamides of the general formula

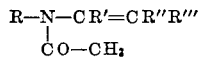

where
R=unbranched or branched alkyl residue with 1-8 C atoms, phenyl residue,
R'=H, CH₃, C₂H₅
R''=H, CH₃, C₂H₅
R'''=H, CH₃, C₂H₅, where R' and R''' can also be joined into a cyclohexyl ring, which comprises reacting an azomethine of the general structure R—N=CR'—CHR''R''', where the residues R, R', R'' and R''' have the meaning stated above, with acetic acid anhydride at a temperature of −30 to 20° C., and with a tertiary amine in a quantity of 0.1 to 0.5 mol, referred to 1 mol azomethine and 1 mol acetic acid anhydride, and treating the reaction mixture after the reaction is completed with a quantity of ketene that is molar to the created acetic acid, and separating the created N-alkenyl-acetamide from the reaction mixture.

---

It is known that N-alkenyl-acetamides are obtainable by conversion of an azomethine with acetic acid anhydride in the presence of a tertiary amine and an inert solvent according to the equation

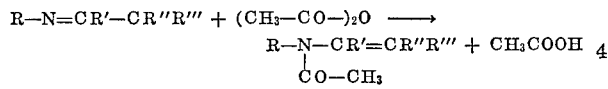

In such case the tertiary amine has the task of protecting N-alkenyl-acetamide from the acetic acid that has formed. Theoretically 1 mol of tertiary amine is necessary for this per mol of azomethine used. Moreover, it catalyzes the addition of the acetic acid anhydride to the

function of the azomethine.

After the reaction is completed the product is purified by fractional distillation.

We have now discovered a process for producing N-alkenyl-acetamides of the general formula

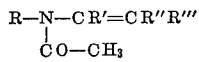

where
R=unbranched or branched alkyl residue with 1-8 C atoms, phenyl residue,
R'=H, CH₃, C₂H₅
R''=H, CH₃, C₂H₅
R'''=H, CH₃, C₂H₅, where R' and R''' can also be joined into a cyclohexyl ring from an azomethine of the general structure

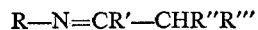

where the residues R, R', R'' and R''' have the meaning mentioned above, and one heats acetic acid anhydride preferably in the presence of an inert organic solvent, at a temperature of −30 to 20° C., preferably −20 to 5° C. and for further split-off of the acetic acid one can heat to the boiling point of the solvent.

The process is characterized by the fact that one uses a tertiary amine in a quantity of up to 0.5 mol, preferably 0.1 to 0.4 mol, referred to 1 mol azomethine and 1 mol acetic acid anhydride, treats the reaction mixture after the conversion is completed with the quantity of ketene that is molar to the created acetic acid, and then one purifies the product in the known manner by distilling or perhaps crystallizing. Thus the summation equation of the process of the invention reads:

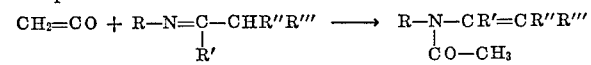

A separation of amine and anhydride is not necessary in this process. Moreover, an incomplete separation of the solvent is sufficient, because nevertheless it can be introduced again practically without loss at the next charge together with the amine, the acetic acid anhydride and the N-alkenylacetamide.

Another advantage of this process is the higher yield of N-alkenyl-acetamide.

Suitable azomethines are for instance N-methylacetaldimine, N-ethylacetaldimine, N-propylacetaldimine, N-butylacetaldimine, N-hexylacetaldimine, N-n-octylacetaldimine, N - 2 - ethylhexylacetaldimine, N-phenylacetaldimine, N - methyl - propanoldimine, N - ethylisobutanaldimine, N-butylbutanaldimine, N-methyloctanaldimine, N - iso - propylcyclohexanaldimine, N-phenylcyclohexanaldimine, N - phenylbenzaldimine, N - (p - chlorphenyl-) benzaldimine.

Suitable tertiary amines are for instance triethylamine, triethylene diamine, N,N-dimethylbenzylamine, N,N-dimethylaniline, pyridine, methylpyridine, quinoline.

For solvents one can use for instance hydrocarbons like petrolether, cyclohexane, benzene, toluene, esters like methyl-, ethyl-, butyl-acetate, ethers like diethylether, dibutylether, tetrahydrofurane, 1,4-dioxane, chlorinated hydrocarbons like chlorbenzene, methylene chloride, chloroform, carbon tetrachloride, ethyl chloride, trichlorethylene.

The products made in accordance with the invention are suitable, among other things, as intermediate products for organic syntheses, and as monomers and comonomers in the production of plastics.

Besides the very simple process in producing higher yields, it is surprising that when using tertiary amines the ketene does not oligomerize to dehydracetic acid.

EXAMPLE 1

Into a solution of 1 mol N-ethylacetaldimine in 50 ml. benzene, at −10° C. in the course of 1 hour a mixture of 1 mol acetic acid anhydride and 0.2 mol pyridine was dripped, the reaction mixture was left standing at −10° to −5° C. for 12 hours, then it was heated under reflux for 2 hours, and finally it was treated with 1 mol ketene at room temperature. The processing was done by fractional distillation. The yield of N-ethyl-N-vinylacetamide, referred to N-ethylacetaldimine and acetic acid anhydride: 84%. B.P.₁₀ mm. Hg: 65–66° C. The purity of the product was 97.5%. The analysis was made gas-chromatographically (WLD).

EXAMPLE 2

In the same test as described in Example 1, the 0.2 mol pyridine was replaced by 0.1 mol triethylene diamine. The yield of N-ethyl-N-vinylacetamide on this run was 84.8%, the purity of the product, with otherwise identical work methods, was 98.1%. The analysis was made as in Example 1.

EXAMPLE 3

A solution of 1 mol N-methylacetaldimine in 30 ml. methylene chloride was treated at —15° to —5° C. within 1 hour with a mixture of 1 mol acetic acid anhydride and 0.05 mol triethylamine, left standing for 24 hours at —5° C., treated at the same temperature with 1 mol ketene and fractionated by distilling. The yield of N-methyl-N-vinylacetamide, referred to the 100% product, was 81%, with a purity of 92%. The analysis was made gas - chromatographically (WILD). B.P.$_{10\ mm.\ Hg}$: 51–52° C.

EXAMPLE 4

0.75 mol N-hexylacetaldimine dissolved in 75 ml. methylene chloride, was treated at —5 to 0° C. during the course of ½ hour with a solution of 0.3 mol triethylamine in 0.75 mol acetic acid anhydride, left standing for 1.5 hours at —10° C. and for 12 hours at room temperature, heated for 2 hours under reflux and finally treated with 0.75 mol ketene at 20° C. The processing was done by fractional distillation in a vacuum. Besides the first two fractions which, besides methylene chloride and triethylamine, contained the acetic acid anhydride, the distillate was divided into two fractions: 16.1 g. with B.P.$_{0.8–0.3\ mm.\ Hg}$: 40–69.5° C. This fraction was, referred to N-hexyl-N-vinylacetamide, 17.9% pure. 111.7 g. with B.P.$_{0.3\ mm.\ Hg}$: 69–69.5° C. The purity was 98%. Total yield of N-hexyl-N-vinylacetamide: 88.7%. The analysis was made gas-chromatographically as in the other examples.

EXAMPLE 5

Into a solution of 1 mol N-methyl-isobutanaldimine in 50 ml. benzene at —5° C. within 1.5 hours a mixture of 1 mol acetic acid anhydride and 0.3 mol triethylamine was dripped. The after-reaction occurred at —5° C. during 15 hours. Subsequently the reaction mixture was heated for 4 hours under reflux, treated with 1 mol ketene at room temperature and processed by distilling. The yield of N-methyl-N-(β-β-dimethylvinyl-) acetamide, referred to a 100% product, was 76%, the purity was 98%. The analysis was made gas-chromatographically as in the other examples. B.P.$_{10\ mm.\ Hg}$: 77–78° C.

EXAMPLE 6

0.5 mol N-phenylcyclohexanaldimine were dissolved in 250 ml. methylene chloride, treated with 0.6 mol acetic acid anhydride and subsequently with 0.5 mol ketene. After withdrawal of the solvent at room temperature the reaction mixture was put through a thin-layer evaporator. Vacuum: 0.02 mm. Hg, jacket temperature: 200° C. There the N-phenyl-N(-cyclohexene-1)-acetamide went over as a yellow, viscous oil. Yield: 81%.

*Analysis.*—Actual (percent): C=C, 12.0; C, 78.14; H, 8.54; N, 6.51. Computed (percent): C=C, 11.2; C, 78.10; H, 7.91; N, 6.52.

EXAMPLE 7

0.5 mol N-2-ethylhexyl acetaldimine dissolved in 70 ml. methylene chloride were treated at about —5° C. for 20 minutes with a solution of 0.2 mol triethylamine in 0.5 mol acetic acid anhydride, left standing for 1.5 hours at —5° C. and for 12 hours at room temperature, and then heated under reflux for 2 hours. The reaction mixture obtained in this manner was treated at room temperature with 0.5 mol ketene, the solvent together with the main quantity of the triethylamine was distilled off at normal pressure, the remaining triethylamine and the acetic acid anhydride in a water-spray vacuum, and finally the N-2-ethylhexyl-N-vinylacetamide in a high vacuum.

The total yield of N-2-ethylhexyl-N-vinylacetamide, referred to the azomethine used was 81%, the purity of the main fraction (B.P.$_{0.3\ mm.\ Hg}$: 92–93° C.) was 98.5%.

EXAMPLE 8

Analogously to Example 7, 0.5 mol N-n-octylacetaldimine were converted with acetic acid anhydride into N-n-octyl-N-vinylacetamide and purified by distilling. The yield of 98% pure N-n-octyl-N-vinylacetamide was 76%. B.P.$_{0.3\ mm.\ Hg}$: 96–97° C.

The invention claimed is:
1. Process for producing N-alkenyl-acetamides of the general formula

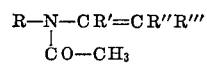

where
R=unbranched or branched alkyl residue with 1–8 C atoms, phenyl residue,
R'=H, $CH_3$, $C_2H_5$
R''=H, $CH_3$, $C_2H_5$
R'''=H, $CH_3$, $C_2H_5$, where R' and R''' can also be joined into a cyclohexyl ring,
which comprises reacting an azomethine of the general structure R—N=CR'—CHR''R''', where the residue R, R', R'' and R''' have the meaning stated above, with acetic acid anhydride at a temperature of —30 to 20° C., and with a tertiary amine in a quantity of 0.1 to 0.5 mol, referred to 1 mol azomethine and 1 mol acetic acid anhydride, and treating the reaction mixture after the reaction is completed with a quantity of ketene that is molar to the created acetic acid, and separating the created N-alkenyl-acetamide from the reaction mixture.

2. Process according to claim 1, in which the reaction of the azomethine and acetic acid anhydride is performed in an inert solvent, and in which after the reaction the solution is heated to the boiling point of the solvent to further split off acetic acid.

References Cited

UNITED STATES PATENTS 3,317,603  5/1967  Blance et al. _____ 260—561 R
3,557,207  1/1971  Hammond _____ 260—561 R LEWIS GOTTS, Primary Examiner E. G. LOVE, Assistant Examiner U.S. Cl. X.R.

260—562 R, 562 P